F. M. MATTICE.

Tile Machine.

No. 3,851. Reissued Feb. 22. 1870.

Attest:
Jas. C. Marr
Wm. Read

Inventor:
F. M. Mattice.
by Munn & Co. Agts. Attys.

N. PETERS, Photo-Lithographer, Washington, D. C.

United States Patent Office.

F. M. MATTICE, OF DETROIT, MICHIGAN.

*Letters Patent No.* 20,286, *dated May,* 18, 1858; *reissue No.* 3,851, *dated February* 22, 1870.

IMPROVEMENT IN TILE-MACHINES.

The Schedule referred to in these Letters Patent and making part of the same

*To whom it may concern:*

Be it known that I, F. M. MATTICE, of Detroit, in the county of Wayne, and State of Michigan, have invented a new and useful Improvement in Machinery for making Drain and other Tile, for which I received a patent, May 18, 1858; and I do declare that the following is a true and accurate description thereof, reference being had to the accompanying drawings and to the letters of reference marked thereon and being a part of this specification.

Figure 1:
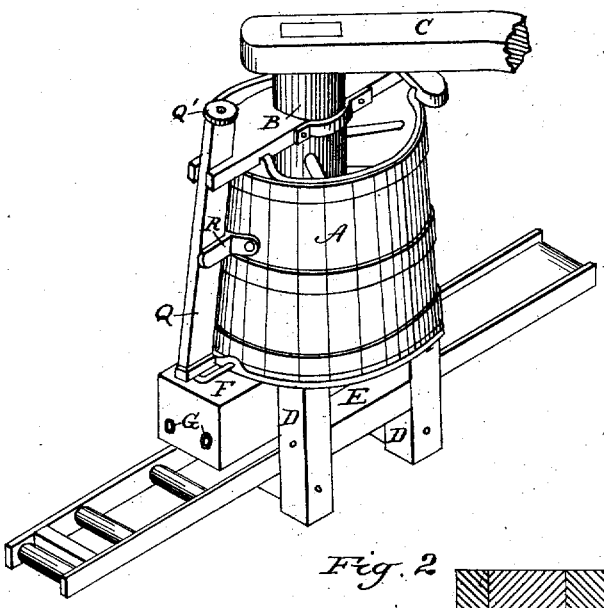
Figure 1 is a perspective view of my invention.
Figure 3:
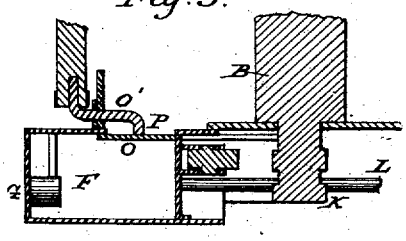
Figure 4:
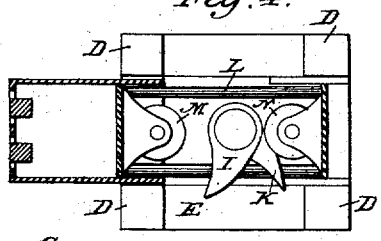
Figure 2:
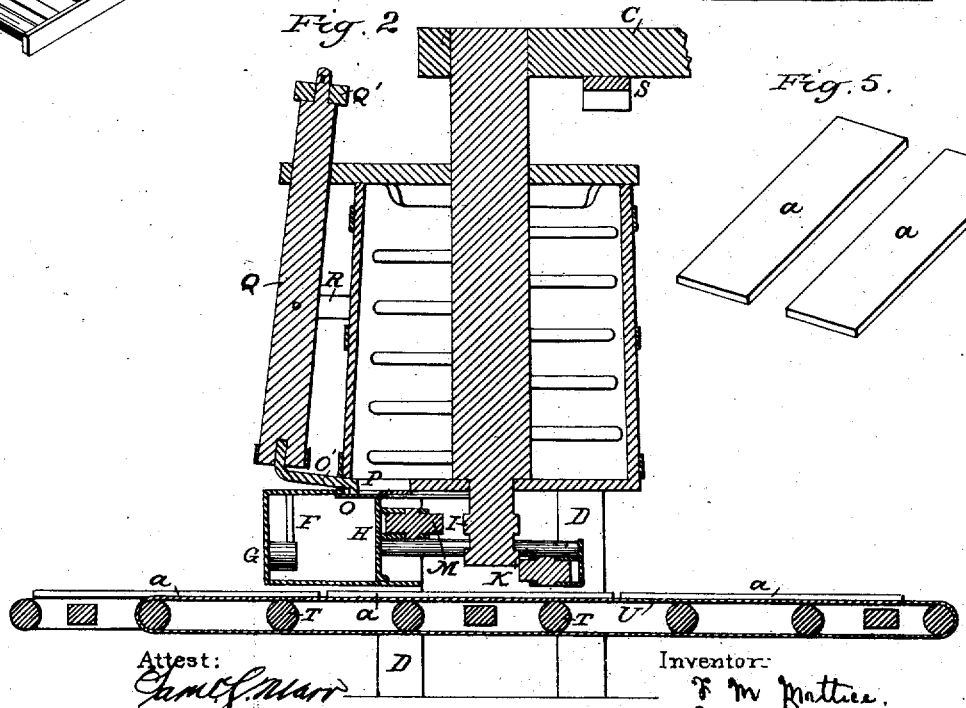
Figure 2 is a vertical section.
Figure 5:
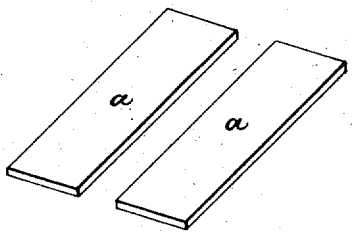

Figures 3, 4, and 5 are sectional views.

The nature of my invention consists in a cut-off valve, operated alternately by a cam upon the sweep and by the mechanism impelling the plunger, as hereinafter more fully described.

Also, in the construction and arrangement of two cams upon the main shaft, by means of which the forward motion of the plunger is less rapid than its backward motion, and a lost motion occurs at each revolution of said shaft while the box is being filled with clay, as hereinafter more fully described.

A, in the drawings, is the tub of the pug-mill, in the center of which is the vertical shaft B, properly supported at top and bottom of the tub, in such a manner as to turn freely upon its axis, and armed with pins for the purpose of mixing the mortar.

C is a sweep or draw-beam, secured to the top of the vertical shaft B, by means of which, when the machine is driven by horse-power, motion is given to said shaft.

A frame, of which D are four short posts, and E the girths, supports the pug-mill, which is secured upon the top of the posts D.

F is a forming or mortar-chest attached to the under side of the pug-mill, at one side, as shown in the drawings. That portion of this chest which is under the pug-mill opens into the mill from which it receives the mortar.

The outer end of the chest is provided with openings G, having an external form and diameter corresponding to the size and form of the tile, and having also a core which forms the bore of the tile.

H is a plunger working inside the chest F, the interior of which it accurately fits.

I and K are cams secured upon the lower end of the shaft B, and are intended to operate the plunger H, which is supported and guided by the rods L which pass along upon the inside of the frame D E.

To avoid friction between the plunger and the cams, the friction-rollers M and N are interposed.

In driving the plunger forward, for the purpose of pressing the clay through the orifices G, the cam I acts upon the friction-wheel M.

After the stroke of the plunger has been made, it is returned by the action of the cam K upon the friction-wheel M.

These cams are so placed upon the shaft B that as soon as the forward stroke of the plunger has been completed, the cam K acts upon the friction-wheel N, and returns the plunger; that is, draws it out from the box F, so that the shaft may perform nearly three-fourths of a revolution for the purpose of filling the box with mortar before the cam I begins to act upon the cam M, when the action of this cam is sudden, and it is immediately driven forward, so that the plunger is at rest for about three-fourths of the time the machine is at work, and this interval is sufficient to allow the box to become filled with mortar from the mill.

O is a cut-off valve, to prevent the mortar from being forced back into the pug-mill in the forward motion of the plunger. This valve is so arranged that when the plunger commences its forward movement, it cuts off all communication between the mortar in the mill and the chest.

This movement of the cut-off is effected by the upright lever 2, the fulcrum of which is attached to the side of the pug-mill, as seen at R, the lower end of said lever being attached to the valve O by means of the connecting-rod O′.

This lever has a friction-wheel, Q′, upon its upper end, and is operated by a cam, S, attached to the under side of the draw-beam or sweep C.

The cams I and K are so placed, relative to each other and to the shaft B, that when the beam C sweeps around and brings the cam S into contact with the friction-roller Q′, it causes the bottom of the lever Q to move inward and close the opening P.

The moment this opening is closed, the cam I begins to act upon the wheel M, and this in turn upon the plunger H, driving said plunger forward and forcing the mortar through the orifices G.

The connecting-rod O′ passes through an opening in the bottom of the mill.

The cut-off valve O is driven along by and with the plunger H where it remains at rest, and for a time leaving the opening P unobstructed until the sweep C has performed another revolution and brought the cam S into contact with the wheel Q′.

The moment the cam I leaves the wheel M, the cam K begins to act upon the wheel N, and drives the plunger back to its original position, leaving the passage P open, as before mentioned.

The tiles, as they are formed by the passage of the mortar through the orifices G, are delivered upon handling boards *a*, which boards are passed under the center of the machine upon a series of rollers, T, and endless apron U.

This apron is carried forward by the force of the tiles as they protrude upon the boards *a* from the orifices G, said tiles being formed in one conti uous piece, and cut into proper lengths by means of a eries of wires stretched upon a frame. Each board is o suitable length for two or more lengths of tile, a d as fast as the boards are filled and the tile cut into proper length, they can be removed to a drying-rack, and empty boards are placed upon the apron at U′, wh nce they are drawn under the machine by the movement of the apron U, as heretofore specified.

What I claim as my invention, and desire to secure by Letters Patent, is—

1. The cut-off valve O connected by the rod O′ to the lever Q, suitably pivoted and provided at its upper end with a friction-wheel, Q′, and operated alternately by the cam S attached to the sweep C, and by the mechanism impelling the plunger H, as described, shown and set forth.

2. The arrangement, in the tile-machine herein shown, of the cams I and K upon the same side of the shaft B, and with the plunger H, when said cams have respectively such a contour and such a relation to each other that by their action the forward motion of the plunger H is less rapid than its backward motion, and that a lost motion occurs at each revolution of the shaft aforesaid while the box is being filled with clay, all as herein shown and described.

F. M. MATTICE.

Witnesses:
L. C. HYDE,
H. F. EBERTS.